US008662338B2

(12) United States Patent
Moricca

(10) Patent No.: US 8,662,338 B2
(45) Date of Patent: Mar. 4, 2014

(54) CONTAINER FOR RECEIVING A SUBSTANCE INCLUDING NUCLEAR MATERIAL

(75) Inventor: Salvatore Moricca, New South Wales (AU)

(73) Assignee: Australian Nuclear Science and Technology Organisation, New South Wales (AU)

( * ) Notice: Subject to any disclaimer, the term of this patent is extended or adjusted under 35 U.S.C. 154(b) by 932 days.

(21) Appl. No.: 11/993,267

(22) PCT Filed: Jun. 26, 2006

(86) PCT No.: PCT/AU2006/000890
§ 371 (c)(1),
(2), (4) Date: Jan. 12, 2010

(87) PCT Pub. No.: WO2006/135987
PCT Pub. Date: Dec. 28, 2006

(65) Prior Publication Data

US 2010/0133269 A1 Jun. 3, 2010

(30) Foreign Application Priority Data

Jun. 24, 2005 (AU) ................................ 2005903356

(51) Int. Cl.
*B65D 51/16* (2006.01)
*B09B 1/00* (2006.01)

(52) U.S. Cl.
USPC ........... 220/371; 220/303; 220/601; 220/625; 220/661; 220/676; 220/903; 220/916

(58) Field of Classification Search
USPC ............ 220/303, 369–372, 495.04, 601, 625, 220/661, 676, 913, 916
See application file for complete search history.

(56) References Cited

U.S. PATENT DOCUMENTS

| | | | | | |
|---|---|---|---|---|---|
| 1,637,656 | A | * | 8/1927 | Radcliffe | 312/31.1 |
| 2,366,428 | A | * | 1/1945 | Scott | 55/441 |
| 2,633,131 | A | * | 3/1953 | Grosvenor, Jr. | 128/203.23 |
| 2,650,673 | A | * | 9/1953 | Bering et al. | 220/371 |
| 3,083,861 | A | * | 4/1963 | Amberg et al. | 220/371 |

(Continued)

FOREIGN PATENT DOCUMENTS

GB 1136194 12/1968

OTHER PUBLICATIONS

European Patent Office, Search Report in European Application No. 06741276, Dec. 3, 2010.

(Continued)

*Primary Examiner* — J. Gregory Pickett
*Assistant Examiner* — Ned A Walker
(74) *Attorney, Agent, or Firm* — Wood, Herron & Evans, L.L.P.

(57) ABSTRACT

A container to be received in a processing apparatus to subject the container to heat and/or pressure. The container is adapted to receive and contain a substance that includes nuclear material. The container includes a hollow body having an interior within which the substance is to be located. The body includes an opening through which the substance can be moved with respect to the interior. A lid is removably attached to the body to close the opening. At least one filter allows fluid flow into and from the interior. The body and lid hermetically seal the interior except for the at least one filter.

18 Claims, 3 Drawing Sheets

(56) References Cited

U.S. PATENT DOCUMENTS

| | | | | | |
|---|---|---|---|---|---|
| 3,369,121 | A | * | 2/1968 | Bruno et al. | 250/432 R |
| 3,754,141 | A | * | 8/1973 | Leebl et al. | 250/507.1 |
| 3,774,035 | A | * | 11/1973 | Litt | 252/645 |
| 3,801,818 | A | * | 4/1974 | Hulit et al. | 250/432 R |
| 4,366,095 | A | | 12/1982 | Takats et al. | |
| 4,396,583 | A | * | 8/1983 | LeBoeuf | 422/301 |
| 4,535,250 | A | * | 8/1985 | Fields | 250/507.1 |
| 4,618,071 | A | * | 10/1986 | Vincent | 220/371 |
| 4,625,122 | A | * | 11/1986 | Botzem et al. | 250/506.1 |
| 4,704,254 | A | * | 11/1987 | Nichols | 422/28 |
| 4,752,437 | A | * | 6/1988 | Ito et al. | 376/272 |
| 4,782,231 | A | * | 11/1988 | Svoboda et al. | 423/249 |
| 4,808,337 | A | | 2/1989 | Ramm et al. | |
| 4,834,917 | A | | 5/1989 | Ramm et al. | |
| 5,156,290 | A | * | 10/1992 | Rodrigues | 220/87.1 |
| 5,248,453 | A | * | 9/1993 | Ramm | 588/16 |
| 5,296,145 | A | | 3/1994 | Allington et al. | |
| 5,527,705 | A | * | 6/1996 | Mussi et al. | 435/297.1 |
| 5,661,265 | A | * | 8/1997 | Yarbrough et al. | 174/50 |
| 5,727,707 | A | * | 3/1998 | Wickland et al. | 220/288 |
| 5,759,241 | A | * | 6/1998 | Klett et al. | 96/134 |
| 5,830,371 | A | * | 11/1998 | Smith et al. | 210/787 |
| 5,834,788 | A | * | 11/1998 | Fu et al. | 250/506.1 |
| 5,894,134 | A | * | 4/1999 | Kissinger | 250/506.1 |
| 5,911,332 | A | * | 6/1999 | Wickland et al. | 220/288 |
| 5,949,084 | A | * | 9/1999 | Schwartz | 250/506.1 |
| 5,954,219 | A | * | 9/1999 | Nichols et al. | 220/259.1 |
| 5,968,459 | A | * | 10/1999 | Nalepa et al. | 422/300 |
| 5,988,426 | A | * | 11/1999 | Stern | 220/371 |
| 6,372,157 | B1 | * | 4/2002 | Krill et al. | 252/478 |
| 6,419,886 | B1 | * | 7/2002 | Oberdorfer et al. | 422/300 |
| 6,489,623 | B1 | * | 12/2002 | Peters et al. | 250/506.1 |
| 6,538,259 | B2 | * | 3/2003 | Matsunaga et al. | 250/506.1 |
| 6,568,539 | B1 | | 5/2003 | Deibel et al. | |
| 6,619,499 | B1 | * | 9/2003 | Lin | 220/371 |
| 6,716,361 | B2 | * | 4/2004 | Deibel et al. | 210/797 |
| 6,726,047 | B2 | * | 4/2004 | Lin | 220/203.11 |
| 6,727,510 | B2 | * | 4/2004 | Matsunaga et al. | 250/496.1 |
| 6,785,355 | B2 | * | 8/2004 | Georgii | 376/272 |
| 7,199,375 | B2 | * | 4/2007 | Drobnik et al. | 250/455.11 |
| 7,330,526 | B2 | * | 2/2008 | Singh | 376/272 |
| 7,933,374 | B2 | * | 4/2011 | Singh | 376/272 |
| 2005/0269390 | A1 | | 12/2005 | Martin | |
| 2006/0076520 | A1 | * | 4/2006 | Drobnik et al. | 250/506.1 |

OTHER PUBLICATIONS

Austrialian Patent Office, International Search Report in PCT/AU2006/000890, Aug. 3, 2006.

* cited by examiner

CONTAINER FOR RECEIVING A SUBSTANCE INCLUDING NUCLEAR MATERIAL

TECHNICAL FIELD

The present invention relates to methods and apparatus for containing substances to be subjected to high pressures and/or temperatures, and more particularly but not exclusively to methods and apparatus for processing nuclear waste.

BACKGROUND OF THE INVENTION

It is known to store and transport nuclear waste by having the nuclear material immobilized by being a component of a synthetic "rock" or glass-ceramic matrix. The rock matrix being located in a metal canister. As one example, the rock matrix is formed by mixing the nuclear material in powdered form, with a powered metal, such as copper. However, in this regard other materials can be used, such as a ceramic or glass or mixed glass-ceramic powder. The resulting rock matrix is highly resistant to corrosion and retains the waste in an immobilized form. The canisters are also formed from a material that is highly resistant to corrosion, such as stainless steel.

In one example the canister is of a generally cylindrical configuration with the longitudinal cylindrical wall being of a convoluted bellows or second example an "hour glass" (dumb-bell) configuration. Prior to the canister being hermetically sealed, gas is evacuated therefrom so that the canister has a lowered internal pressure relative to its surroundings. Thereafter the canister is subjected to a hot isostatic pressing process in which the temperature of the canister and its contents is raised (typically to a temperature up to 1400° C.) for a period of two to four hours at a pressure up to 400 MPA. Due to the corrugated side wall of the canister and the softening of the metal at high temperature, the pressure is transferred to the powder which results in the formation of the abovementioned dense matrix.

Examples of the abovementioned canisters and process are described in U.S. Pat. Nos. 4,834,917 and 4,808,337. In U.S. Pat. No. 4,834,917 a container is described in which an inner canister is located within an outer canister prior to being inserted in the furnace.

A disadvantage of the above described method is that should the canister not be totally hermetically sealed, then damage to the furnace can result. If the canister leaks, gas from within the furnace will enter the canister with the result, that when the environment within the furnace is lowered to ambient pressure, the canister will deform by expanding longitudinally and/or may rupture. This is a disadvantage in that damage to the furnace, in particularly the furnace wall may result. This may be mechanical damage and/or contamination with nuclear material.

OBJECT OF THE INVENTION

It is the object of the present invention to overcome or substantially ameliorate the above disadvantage.

SUMMARY OF THE INVENTION

There is disclosed herein a container to be received in a processing apparatus to subject the container to heat and/or pressure, the container being adapted to receive a substance to be subjected to the heat and/or pressure, said container including:

a hollow body having an interior within which the substance is to be located, the body having an opening through which the substance can be moved with respect to said interior;

a lid removably attached to the body to close said opening;

at least one filter allowing fluid flow into and from said interior; and wherein said body and lid hermetically sealing said interior except for said filter or filters.

Preferably, said body includes longitudinally opposite end walls and a longitudinal side wall extending therebetween, with said opening being in one of said end walls.

Preferably, said filter is in said lid.

In an alternative embodiment, said filter is located in said side wall.

Preferably, said filter is a sintered metal or a ceramic filter.

Preferably, the container further includes a support plate, said plate being located between the filter and said interior to support said filter.

Preferably, said plate is a first plate and said container includes a second support plate with the filter located between the support plates.

Preferably, the or each plate is a perforated metal plate.

Preferably, a flange surrounds said opening, and said lid is attached to said flange with a gasket between the lid and the flange.

Preferably, the container includes a port communicating with said interior, said port including a port filter.

Preferably, the container further includes a cap, and wherein said side wall is cylindrical in configuration, and said cap includes an end wall and a peripheral skirt threadably engaged with said side wall so as to be secured thereto.

Preferably, said container includes a first perforated support plate and a second perforated support plate between which the filter is located, the plates being located between said end wall and said side wall with at least one of the plates being threadably engaged with said cap.

Preferably, said end wall has a through passage communicating with said filter.

Preferably, said container further includes a bolt threadably engaged with the cap and operable to aid in securing the cap to said side wall.

Preferably, said cap is a first cap, and said container includes a second cap, with said body having said opening at one end, and a further opening at an end opposite said one end, with said second cap closing said second opening.

Preferably, said second cap includes a peripheral skirt threadably engaged with said side wall.

Preferably, said filter is a first filter, and said container includes a second filter at said second opening.

Preferably, the support plates are first support plates, and said container includes a pair of second perforated support plates between which the second filter is located, with said second cap engaging the second plates to secure the second plates against said side wall.

Preferably, said second plates is threadably engaged with said second cap.

Preferably, said container further includes a bolt threadably engaged with the second cap and operable to inhibit dislodgement of said second cap with respect to said side wall.

There is further disclosed herein, in combination a canister containing said substance, and the above container, wherein said canister is located within the container.

Preferably, said substance includes nuclear material.

Preferably, said nuclear material is nuclear waste.

There is also disclosed herein in combination the above container and said substance.

Preferably, said substance includes nuclear material.

Preferably, said nuclear material is nuclear waste.

Preferably, said substance is silicon.

There is still further disclosed herein, in combination the above container and said substance.

Preferably, said substance includes nuclear material.

Preferably, said nuclear material is nuclear waste.

Preferably, said substance includes silicon.

BRIEF DESCRIPTION OF THE DRAWINGS

Preferred forms of the present invention will now be described by way of example with reference to the accompanying drawings wherein.

DETAILED DESCRIPTION OF THE DRAWINGS

Figure 1:
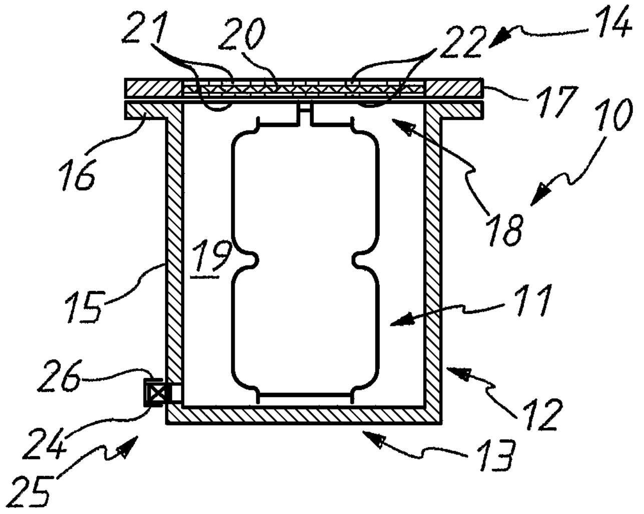
FIG. 1 is a schematic sectioned side elevation of a container housing a canister containing radioactive material and powdered metal or powdered glass or ceramics or mixtures thereof.

In FIG. 1 there is schematically depicted a container 10 within which there is located a canister 11. The container 10 and/or canister 11 can receive any substance to be treated. For example the canister 11 could be filled with a mixture of powdered nuclear material (such as nuclear waste) and powdered metal or ceramics or glass or mixtures. As a particular example the powdered metal may be copper. The contents of the canister 11, as an example, is to be subjected to a pressure up to 400 MPA and mixtures up to 1800° C. for two to four hours. The contents of the canister 11 are subjected to the abovementioned pressure and temperature so that radioactive material and powdered metal (or powdered ceramics) forms a dense monolith. As another example, the substance to be treated could include electrical components.

With reference to the container 10 being used to treat nuclear material, the container 10 with its canister 11 is placed in a furnace, with the furnace chamber being heated and pressurized to the desired temperature and pressure as described above.

The container 10 includes a hollow body 12 having longitudinal opposite end walls 13 and 14 between which a longitudinal generally cylindrical side wall 15 is located. The side wall 15 terminates with a generally annular flange 16. In this embodiment, the end wall 14 is provided by a lid 17 closing the opening 18 in the body 12. When attached to the flange 16 the lid 17 closes the opening 18 and therefore closes the interior 19 of the hollow body 12. Typically a gasket, able to withstand the temperatures to which it is to be subjected, is located between the flange 16 and lid 17.

In this embodiment the lid 17 includes a filter 20 through which fluid may pass. The filter 20 is sandwiched between two perforated metal plates 21 having apertures 22. The plates 21 support the filter 20.

Preferably the filter 20 is a sintered metal filter or a ceramic filter.

During use of the container 10, when placed in the furnace, gas under pressure is allowed to enter the interior 19 through the filter 20.

When the container 10, while still in the furnace, is returned to ambient pressure. If the canister 11 has failed to maintain a vacuum, the canister 11 will longitudinal elongate and/or rupture. The container 10 will prevent the canister 11 engaging the furnace wall and will also contain any material that may exist a failed canister 11. Accordingly the internal walls of the furnace are protected from mechanical damage as well as contamination from radioactive material.

When the canister 11 is to be removed and replaced with a fresh canister, the lid 17 is removed. Typically the lid 17 would be bolted to the flange 16.

The container 10 may also include a sample filter port 25, shown in FIG. 1 only. The port 25 includes a removal plug 24 that incorporates a filter, and a cap 26. Prior to removal of the lid 17, the sample filter port 25 can be used to determine if any release has occurred to the inside of the container 10. This can be done in the following way:

The plug 24 and cap 26 are removed from the port 25 and a suction line attached the port 25 to sample the internal environment via online radiation monitor.

Alternatively the plug 24 remains attached to the container 10 and only the cap 26 is removed. Suction is applied and a sample of gas is drawn through the plug 24. Any particulates in the gas stream will be trapped on the plug 24. After the suction line is removed, the plug 24 is removed and measured for radioactive contamination.

If contamination is found, appropriate measures can be taken in opening the container.

Thirdly, the sample port 25 serves as a test port to determine and effectiveness the filter 20 and of the seal between lid 17 and flange 16.

Figure 2:
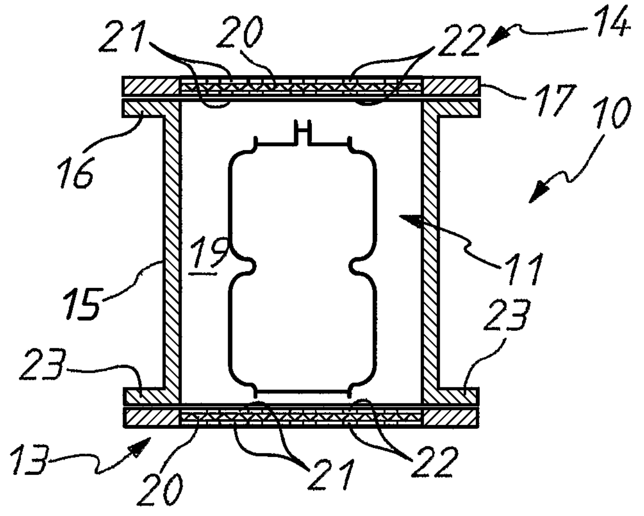
FIG. 2 is a schematic sectioned side elevation of a modification of the container of FIG. 1.

In the embodiment of FIG. 2, both end walls 13 and 14 are provided with a filter.

Figure 3:
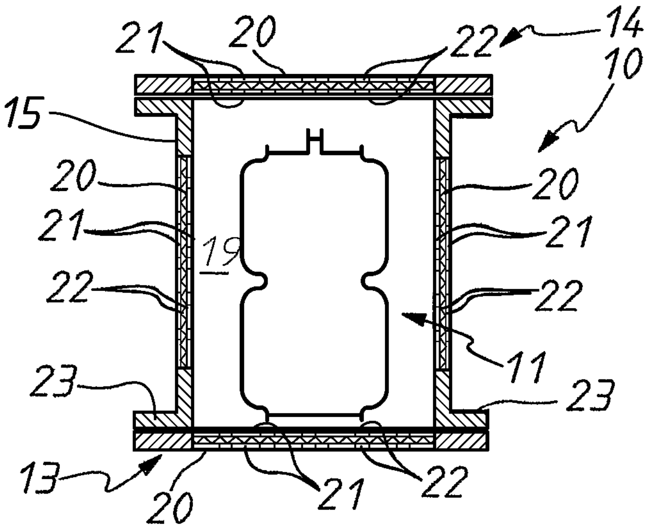
FIG. 3 is a schematic sectioned side elevation of a modification of a container of FIG. 2.

In the embodiment of FIG. 3, both end walls 13 and 14 are provided with a filter while the side wall 15 is also provided with a filter.

In the embodiments of FIGS. 2 and 3, the end wall 13 is also constructed as a lid and is removably attached to the side wall 15 with use of threaded fasteners and the annular flange 23.

Figure 4:
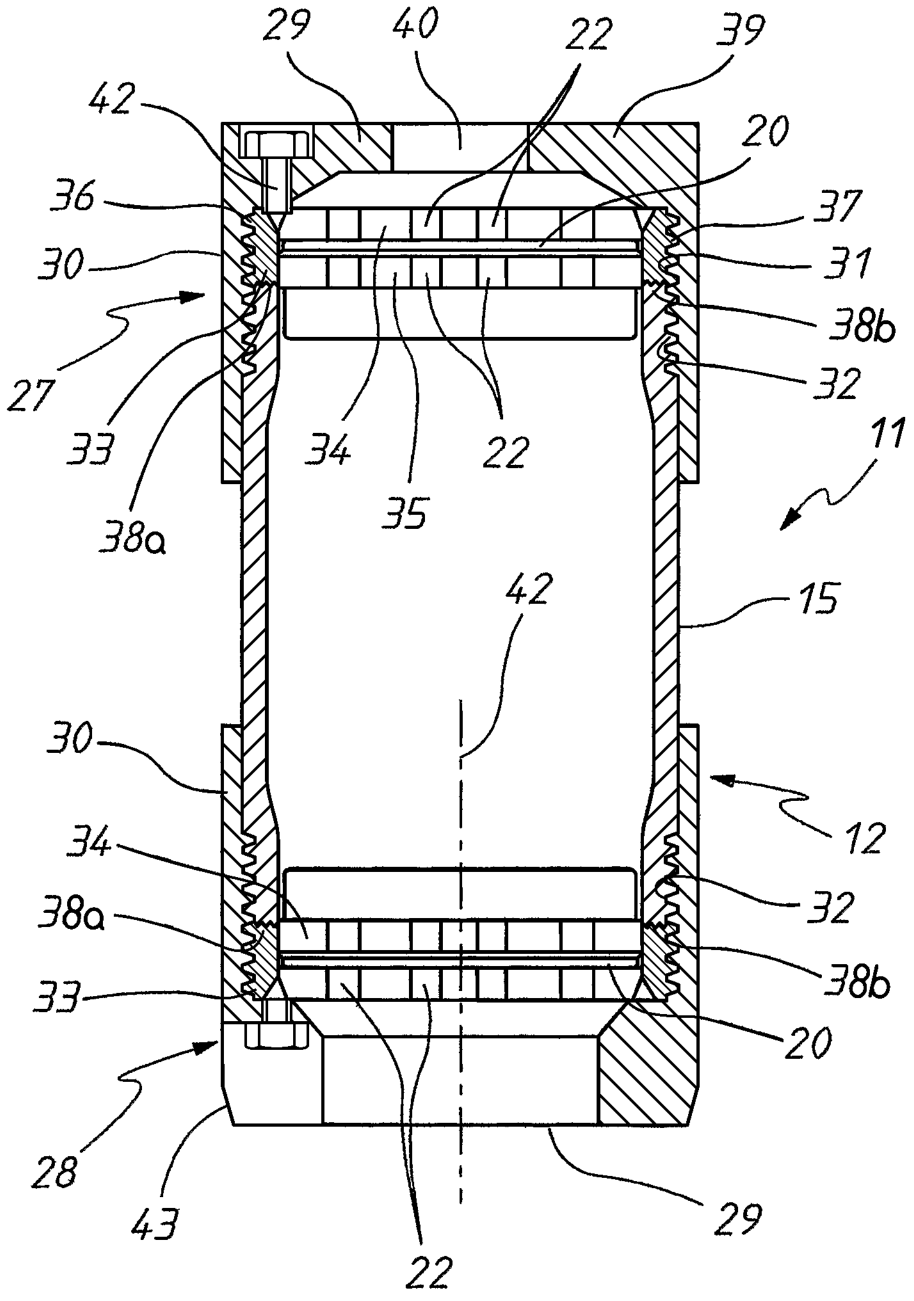
FIG. 4 is a schematic sectioned side elevation of a modification of the canister of FIG. 1, taken along line 4-4 of FIG. 5.
Figure 5:
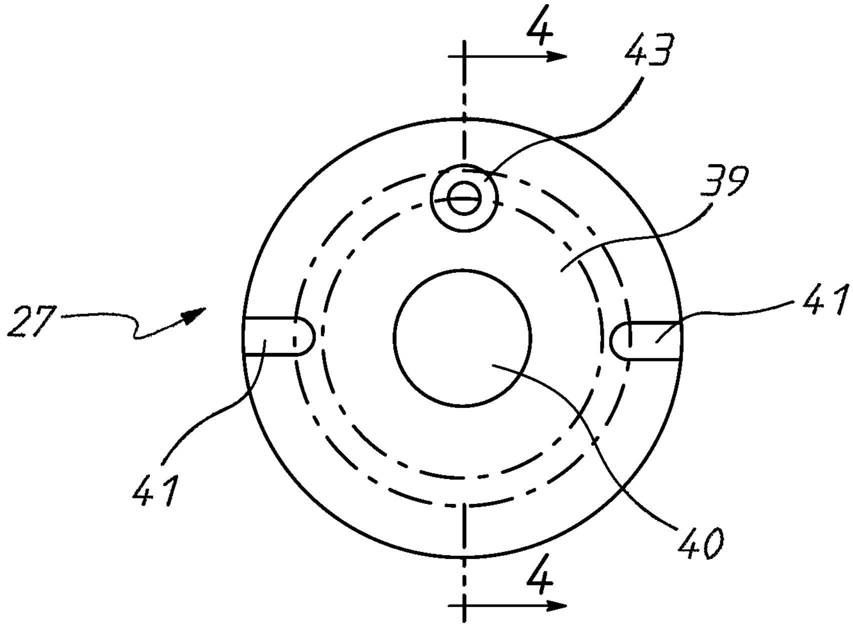
FIG. 5 is a schematic top plan view of the canister of FIG. 4.
Figure 6:
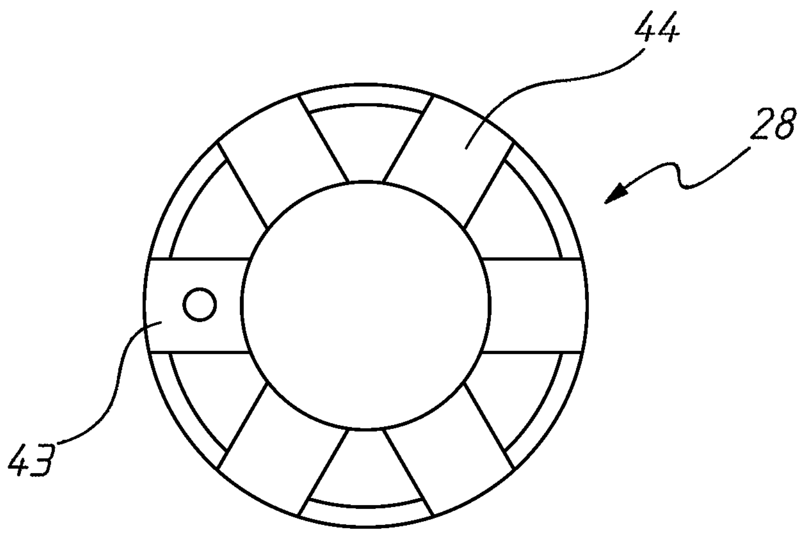
FIG. 6 is a bottom plan view of the canister of FIG. 4.

In FIGS. 4 to 6 there is schematically depicted a modification of the canister 11. In this embodiment the canister 11 has end walls provided by end caps 27 and 28 each end cap 27 includes a transverse end wall 29 from which there extends an annular skirt 30 that has an internal threaded length 31 threadably engaged with an external threaded length 32 of end portions of the side wall 15.

Clamped between each end cap 27 and 28 and the side wall 15 is a respective one of the filters 20. Each filter 20 is located between the pair of perforated plates 33 and 34, each having apertures 22 to provide for fluid communication between the passages 22 via the filter 20. Each plate 33 is of a "cup" configuration so as to have a transverse end wall 35 and an annular skirt 36, the annular skirt 36 having a threaded length 37 threadably engaged with the threaded length 31.

To aid in sealingly connecting each plate 33 with the adjacent extremity of the side wall 15, the end extremity of the side wall 15 has annular ridges 38*a* that nest within annular recesses 38*b* of the plate 33.

The cap 27 has an end wall 39 with a passage 40. Still further the end wall 39 has recesses 41 to aid an operator engage the cap 27 with an appropriate tool to cause rotation thereof about the longitudinal axis 42 to threadably connect and threadably disconnect the cap 27 with respect to the side wall 15. A bolt 42 is threadably engaged in the cap 27 and is movable into engagement with one or both of the plates 33/34 to inhibit accidental dislodgement of the cap 27 with respect to the side wall 15.

The cap 28 also has a bolt 42 for the purposes of inhibiting accidental dislodgement of the cap 28 with respect to the side wall 15. The cap 28 also has a plurality of radially extending projections 44 to aid a user in gripping the cap 28 with an appropriate tool.

Each cap 27,28 includes a hollow 45 communicating with passages 22, and in the case of cap 27, also communicating with the passage 40 passing through the end wall 29.

Either cap 27,28 can act as the lid.

In a modification of the above described embodiments, the container 10 may directly receive the substance to be subjected to the raised temperature and pressure.

The advantage of the above described preferred embodiment is that should the canister 11 fail, the container 10 will prevent the canister 11 engaging the furnace wall and will contain any particle material that may leave the canister 11 should it rupture.

A further advantage is that the container 10 can be used to process a substance that needs to be protected from the surrounding environment. For example, the container 10 could be used to inhibit particles entering the container 10, and/or canister 11 containing the substance to be treated. As a particular example, the container 10 may receive silicon (such as silicon wafers) to be treated, and to be protected from the furnace environment during processing.

The invention claimed is:

1. A container receiving a nuclear material substance to be subjected to heat and/or pressure in a processing apparatus, said container including:
- a hollow body comprising:
  - longitudinally opposite end walls;
  - a longitudinally cylindrical side wall extending between said end walls;
  - an opening in one of said end walls for receiving said substance;
  - an interior for containing said substance;
- a lid removably attached to said hollow body to close said opening;
- at least one sintered metal or ceramic filter allowing fluid flow communication with said interior;
- a first perforated support plate having apertures and located between said at least one filter and said interior to support said at least one filter;
- a second perforated support plate;
- a cap having an end wall and a threaded skirt secured to said side wall;
- wherein said at least one filter is located between said first and second support plates and said first and second support plates are located between said end wall of said cap and said side wall with said first plate or said second plate threadably engaged with said cap; and,
- wherein said lid and said hollow body hermetically seal said interior except for said at least one filter.

2. The container of claim 1, said second support plate further comprising at least one filter and apertures.

3. The container of claim 1, wherein said at least one filter is located in said side wall.

4. The container of claim 1, wherein said end wall has a through passage communicating with said filter.

5. The container of claim 1, wherein said container further includes a bolt threadably engaged with the cap and operable to aid in securing the cap to said side wall.

6. The container of claim 1, wherein the container includes a port communicating with said interior, said port including a port filter.

7. The container of claim 1, further comprising a canister containing said substance, wherein said canister is located within said interior of said container.

8. The container of claim 7, wherein said nuclear material substance further comprises nuclear waste.

9. The container of claim 7, wherein said nuclear material substance further comprises silicon.

10. The container of claim 1, wherein said cap is a first cap, and said container includes a second cap, with said hollow body having a second opening closed by said second cap opposite said first opening.

11. The container of claim 10, wherein said second cap includes a peripheral skirt threadably engaged with said side wall.

12. The container of claim 10, wherein said at least one filter is a first filter, and said container includes a second filter at said opening.

13. The container of claim 12, wherein said first and second support plates are a first pair of support plates, said container further comprising a second pair of perforated support surrounding the second filter and with said second cap engaging the second pair of plates to secure the second pair of plates against said side wall.

14. The container of claim 13, wherein one of said second pair of plates is threadably engaged with said second cap.

15. The container of claim 14, further including a bolt threadably engaged with said second cap and operable to inhibit dislodgement of said second cap with respect to said side wall.

16. A container receiving a nuclear material substance to be subjected to heat and/or pressure in a processing apparatus, said container including:
- a hollow body having:
  - a longitudinally cylindrical side wall;
  - a first end having a first opening for receiving said substance;
  - a second end having a second opening opposite from said first opening;
  - a removable lid closing said first opening;
  - an interior for containing said substance;
- a sintered metal or ceramic first filter allowing fluid communication;
- a second filter at said first opening;
- a first cap having an end wall and a threaded skirt secured to said side wall;
- a second cap closing said second opening;
- a first pair of support plates having apertures and located between said first filter and said interior to support said first filter;
- a second pair of perforated support plates surrounding said second filter with the second cap securing said second pair of support plates against said side wall; and,
- wherein said lid and said hollow body hermetically seal said interior except for said at least one filter.

17. The container of claim 16, wherein one of said second pair of plates is threadably engaged with said second cap.

18. The container of claim 17, further including a bolt threadably engaged with the second cap and operable to inhibit dislodgement of said second cap with respect to said side wall.

* * * * *

UNITED STATES PATENT AND TRADEMARK OFFICE

CERTIFICATE OF CORRECTION

PATENT NO. : 8,662,338 B2
APPLICATION NO. : 11/993267
DATED : March 4, 2014
INVENTOR(S) : Salvatore Moricca It is certified that error appears in the above-identified patent and that said Letters Patent is hereby corrected as shown below:

In the Claims

Column 6

Claim 13, line 23, after “support” insert --plates--.

Signed and Sealed this
Twenty-seventh Day of May, 2014

Michelle K. Lee

Michelle K. Lee
*Deputy Director of the United States Patent and Trademark Office*